June 28, 1932. C. WELLS 1,864,781
METHOD AND APPARATUS FOR TRANSPORTING AUTOMOBILES
Filed Jan. 23, 1931
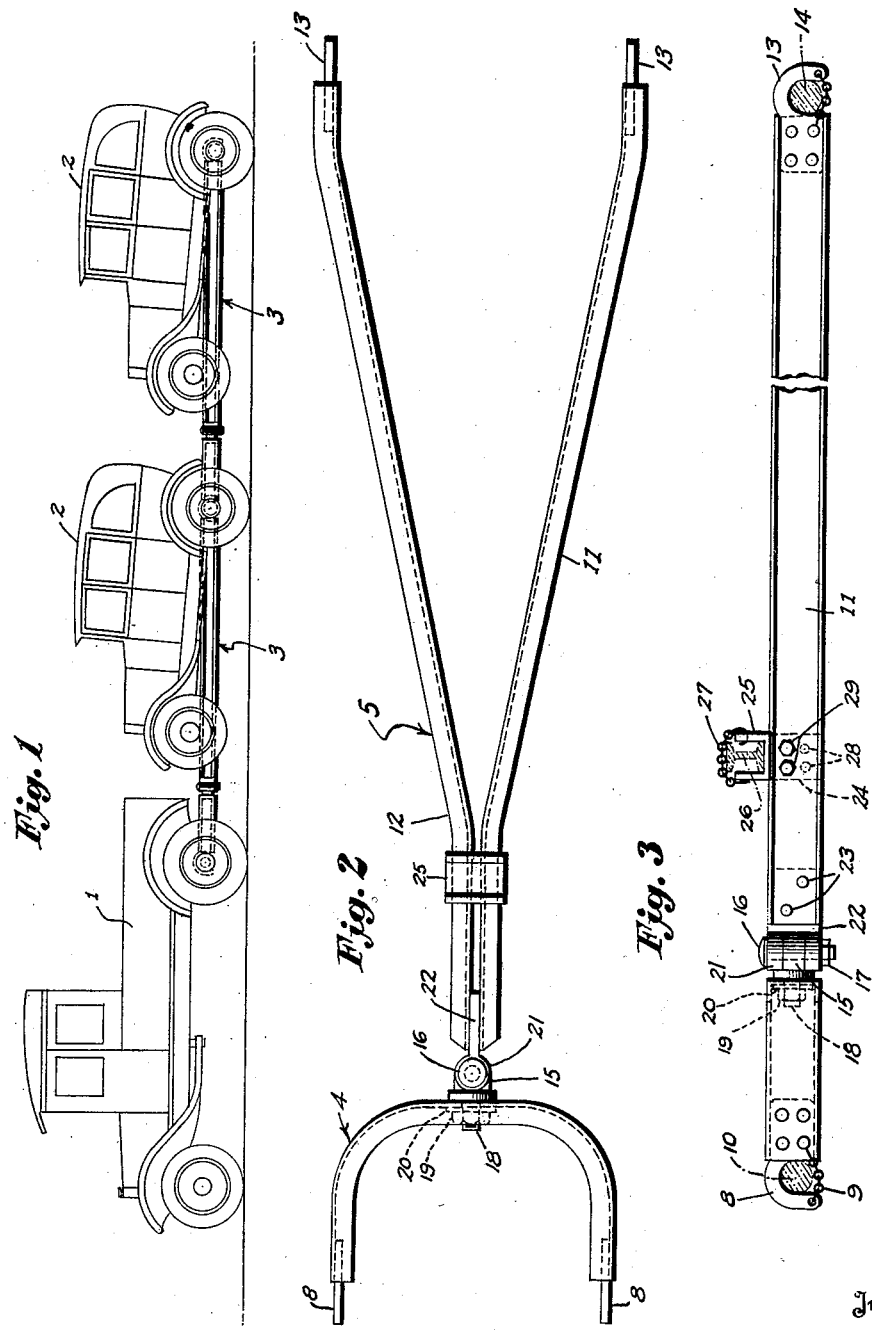

Patented June 28, 1932

1,864,781

UNITED STATES PATENT OFFICE

CHANDLER WELLS, OF BUFFALO, NEW YORK

METHOD AND APPARATUS FOR TRANSPORTING AUTOMOBILES

Application filed January 23, 1931. Serial No. 510,801.

This invention relates to an improved method and device for interconnecting automotive vehicles so that one or more of such vehicles may be towed or otherwise caused to move by another vehicle running under its own power.

In the existing methods of transporting automobiles common use is made of large trucks capable of carrying several smaller vehicles. This method is used principally in delivering new automobiles from the point of assembly to the user and is considered superior to either loading the cars on freight trains, which is objectionable because of the high cost and the excessive handling which it involves, or to driving the cars to the user under their own power, which incurs the expense of having a driver for each car and frequently results in mishandling and abuse of the new cars and lays the dealer open to complaint from the user about the condition of his car at the time of delivery.

While the trucking method is considered the most desirable of the present modes of delivery it has certain inherent disadvantages. Among these may be mentioned the necessity of making expensive return trips with a truck of a size large enough to carry a number of vehicles and the excessive tire wear which results from the use of a truck having a very long wheel base and carrying extremely heavy loads.

With the present industrial practice of locating assembly plants conveniently close to important distribution centers it is not usually necessary to transport assembled cars more than one or two hundred miles and if suitable means are provided it is feasible and advantageous to tow the new cars to their ultimate destination on their own wheels but with outside power. This eliminates the possibility of damage to the power plant or the running gear and the wear on the tires of each of the new vehicles taken individually is found to be negligible. The present invention comprehends a new method of transporting automobiles and the provision of suitable means for connecting a string of cars for this purpose. The invention further provides for compensation in the connecting means of such contingencies as turning and travel over uneven surfaces.

For the attainment of the aforementioned objects a connecting device has been provided which is of simple and inexpensive construction and which may be loaded, along with other like connecting devices, on the towing vehicle for the return trip to the starting point.

The invention further comprehends a method for transporting automobiles by conveniently joining the rear of one vehicle to the front of a following vehicle and maintaining the front wheels of the following vehicle clear of the ground. One of the advantages of the latter feature is the elimination of the problem of steering the towed vehicles. In order to accomplish the association of vehicles in this manner a connecting means has been conceived which is of ample strength and rigidity to resist longitudinal stresses, such as would be applied in starting or stopping the train of vehicles, and vertical loads, chief of which is the weight of the front part of the towed vehicle.

The details of construction of one practical embodiment of the present invention together with an illustration of its application is shown in the accompanying drawing in which:—

Fig. 1 is a side elevation of a towing vehicle and several cars interconnected in accordance with the principles of the present invention;

Fig. 2 is a plan view of the connecting means; and

Fig. 3 is a side elevation thereof.

Fig. 1 of the drawing shows a towing vehicle 1 and a plurality of cars 2 being towed thereby. The connecting means is indicated generally at 3 and embraces means extending from the rear axle housing of one vehicle to the rear axle housing of the following vehicle to interconnect the vehicles and to pass beneath the front axle of the following vehicle to support the front wheels of this vehicle clear of the ground.

The connecting means 3 is made up of front and rear sections 4 and 5 respectively. These sections are pivotally joined in a manner which will presently be described in detail. The front section 4 is preferably of channel cross-section and is generally U-shaped, having parallel, longitudinally extending side portions 6 connected at their rearward ends by a transversely extending portion 7. The forward extremities of the side portions 6 are provided with inverted U-shaped axle engaging members 8 which are riveted or otherwise secured thereto. A chain 9 is anchored to the axle engaging member adjacent the side portion 6 and extends across the open bottom of the axle engaging member to the forward end thereof where it may be disengageably attached. When the axle engaging member is positioned about a rear axle, shown in dotted lines at 10, the chain 9 serves to prevent accidental dislodgment thereof.

The rear section 5 of the connecting means includes a pair of elongated channel members 11 and 12. The forward ends of these members are parallel and substantially adjacent. From the the forward parallel portions the channels flare outwardly to their rearward extremities where they are fitted with axle engaging members 13 similar in design to those of the front section and adapted to engage the rear axle 14 of the towed vehicle at points adjacent the outward extremities thereof. The members 13 of the rear section 5 are spaced at a distance varying slightly from the spacing of the members 8 of the front section 4 so that they will not interfere with the application of the forward end of another connecting means which may be used to join a third car to the train.

The front and rear sections, 4 and 5, are joined in such a way that they may be pivoted relative to each other in a horizontal plane and so that they may be independently rotated about their longitudinal axes. The former pivotal relation allows the towed vehicles to follow the towing vehicle in turning while the independent longitudinal rotation compensates for the misalignment of the rear axles of the towing and the towed vehicles which occurs when one of the wheels of one of the vehicles enters a depression or strikes a projection in the road. It is desirable to provide a connection which will be proof against flexure in a vertical plane so that the load placed upon it through the front axle of the towed vehicle will be rigidly and securely supported; and a structure which will resist the forward thrust of the rear axle of the towed vehicle occasioned by slackening in speed of the towed vehicle.

To accomplish the connection of the front and rear sections in this manner a bearing member is provided which includes a vertically extending bearing 15 adapted to receive a pivot bolt 16 secured by a nut 17, and a forwardly extending stud portion 18 which engages a central aperture in the front section 4 and is secured therein by the cooperation of a nut 19 and a washer 20. The bearing 15 and a cooperating bearing 21 are notched so that they may both engage the pivot bolt 16 and rotate relative to each other about the axis of the pivot bolt. The bearing 21 has a flat, rearwardly extending portion 22 adapted to be held between the forward ends of the channel members 11 and 12 as by rivets 23. A similar flat mounting plate 24 is secured between the channels 11 and 12 and carries at its upper end a seat 25 for the front axle 26 of the towed vehicle. In the present instance a chain 27 has been provided for retaining the front axle against displacement. It may be desired to have the seat vertically adjustable as by providing additional sets of holes 28 in the plate 24 for the securing bolts 29.

It will be seen that a plurality of these connecting members combine to form, in effect, a continuous frame, rigid except for the articulated joints provided intermediate the ends of each individual connecting member.

The transportation of automobiles in accordance with the method and principles herein set forth could be accomplished in a variety of ways and by the employment of modified means of connection. It is not intended that the present invention be limited to the precise details of construction herein contained.

What is claimed is:

1. A method of transporting a plurality of motor cars consisting in rigidly connecting the rear axles of the plurality of towed cars in train formation to the rear of a towing car by rigid tow frames, supporting the front wheels of each towed car off the ground by the respective tow frame, and providing a pivotal joint in each tow frame between the lifted front wheels of each towed car and the immediately adjacent car in front, whereby a composite towing apparatus is provided articulated for steering purposes and uneven road travel.

2. A device for transporting motor cars comprising a front or towing car engaging member, a rear or towed car engaging member for attaching to the rear axle of the towed car, and articulating means for associating said front and rear members for relative pivotal movement in a horizontal plane, said articulating means acting to preserve axial alignment of the front and the rear members against movement in a vertical plane.

3. A device for transporting motor cars comprising a towing car engaging member, a towed car engaging member for attaching to the rear axle of a towed car, a bearing member on the first member mounted for free rotation about the longitudinal axis of said first member and a cooperating bearing member mounted on said second member, said bearing members being pivotal relative to each other about a common vertical axis but maintaining the front and rear members in axial alignment in a common horizontal plane.

4. A device for transporting motor cars comprising a towing car engaging member, a towed car engaging member for attaching to the rear axle of a towed car, an articulated connection for said members, said articulated connection cooperating with said members to provide a composite rigid structure for supporting one end of the towed car so that the wheels at that end are clear of the road, and adjustable means on said second member for supporting a portion of the towed car.

5. A towing apparatus comprising means for engaging the rear axle housing of a towing motor car, means for engaging the rear axle housing of a towed motor car, means for supporting the front axle of the towed motor car in an elevated position, and means connecting the first two means for pivotal movement about a vertical axis for steering purposes.

6. A device for transporting motor cars consisting of a rigid but articulated frame forming a front towing section and a rear towed section, each section being provided at its remote extremities with means for respectively engaging the rear portions of the towing and towed motor cars, said sections being articulated for pivoting about a substantially vertical axis for steering purposes, and means on the rear towed section for supporting the front axle of the towed car in an elevated position.

7. A towing apparatus comprising means for engaging the rear axle housing of a towing motor car, means for engaging the rear axle housing of a towed motor car, means for supporting the front axle of the towed motor car in an elevated position, and means for connecting the first two means for relative pivotal movement about a vertical axis for steering purposes and for relative rotative movement about their common longitudinal axis.

8. A method of transporting automobiles having front and rear wheels, consisting in connecting the rear axle housing of the autobiles to be transported to a towing car by a tow apparatus, and providing a temporarily engageable support for the front under carriage of the vehicle for maintaining the front wheels off the ground.

9. The method of transporting motor cars consisting in providing an articulated towing frame having a front section and a rear section connected for pivoting about a vertical axis, connecting the front section to the rear of a towing motor car and connecting the rear section to the rear portion of the tow car, and providing a temporarily engageable support from the rear section for the front under carriage of the vehicle for maintaining the front wheels off the ground.

10. A tow device for motor vehicles, comprising a frame having means for supporting the frame upon the rear part of a towed motor vehicle, said frame extending forwardly therefrom for connection with a towing vehicle, means for connecting the forward end of the frame to the towing vehicle, said two means supporting the frame at its front and rear end portions from both the towing and the towed vehicles, and means intermediate said first two means and supported by the frame for engaging and holding the front end of the towed vehicle with its front wheels elevated from off the road whereby the weight of said front end of the towed car is supported from and by said first two means.

CHANDLER WELLS.